Sept. 23, 1969  A. L. NASVYTIS  3,468,403
MULTIROLLER BRAKE AND CLUTCH CONSTRUCTION
Filed Nov. 20, 1967  3 Sheets-Sheet 1
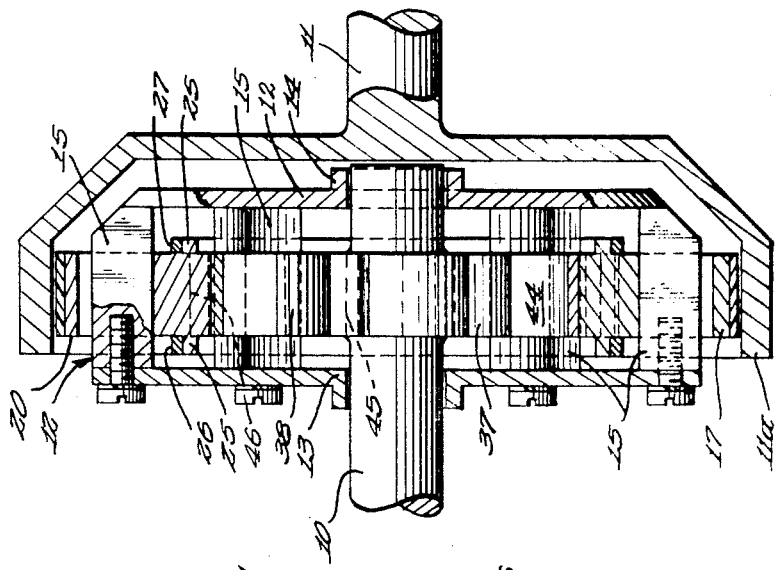
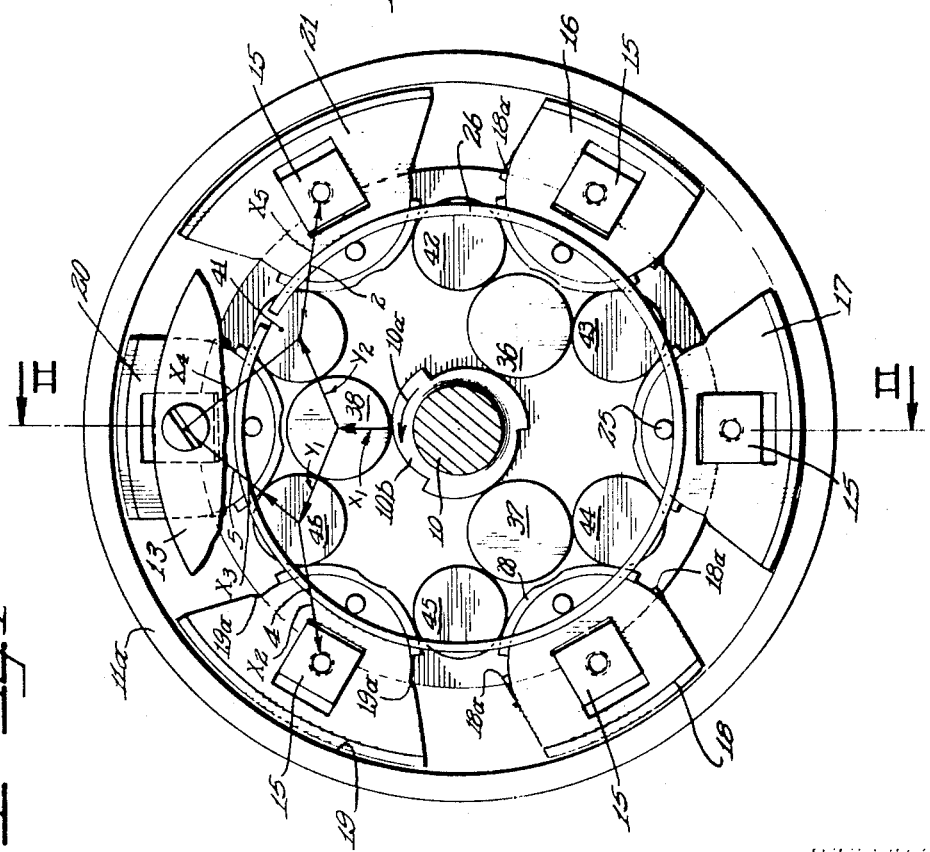
INVENTOR
Algirdas L. Nasvytis
Hill, Sherman, Meroni, Gross & Simpson
ATTORNEYS Sept. 23, 1969  A. L. NASVYTIS  3,468,403
MULTIROLLER BRAKE AND CLUTCH CONSTRUCTION
Filed Nov. 20, 1967  3 Sheets-Sheet 2

INVENTOR.
Algirdas L. Nasvytis

Sept. 23, 1969  A. L. NASVYTIS  3,468,403
MULTIROLLER BRAKE AND CLUTCH CONSTRUCTION
Filed Nov. 20, 1967  3 Sheets-Sheet 2
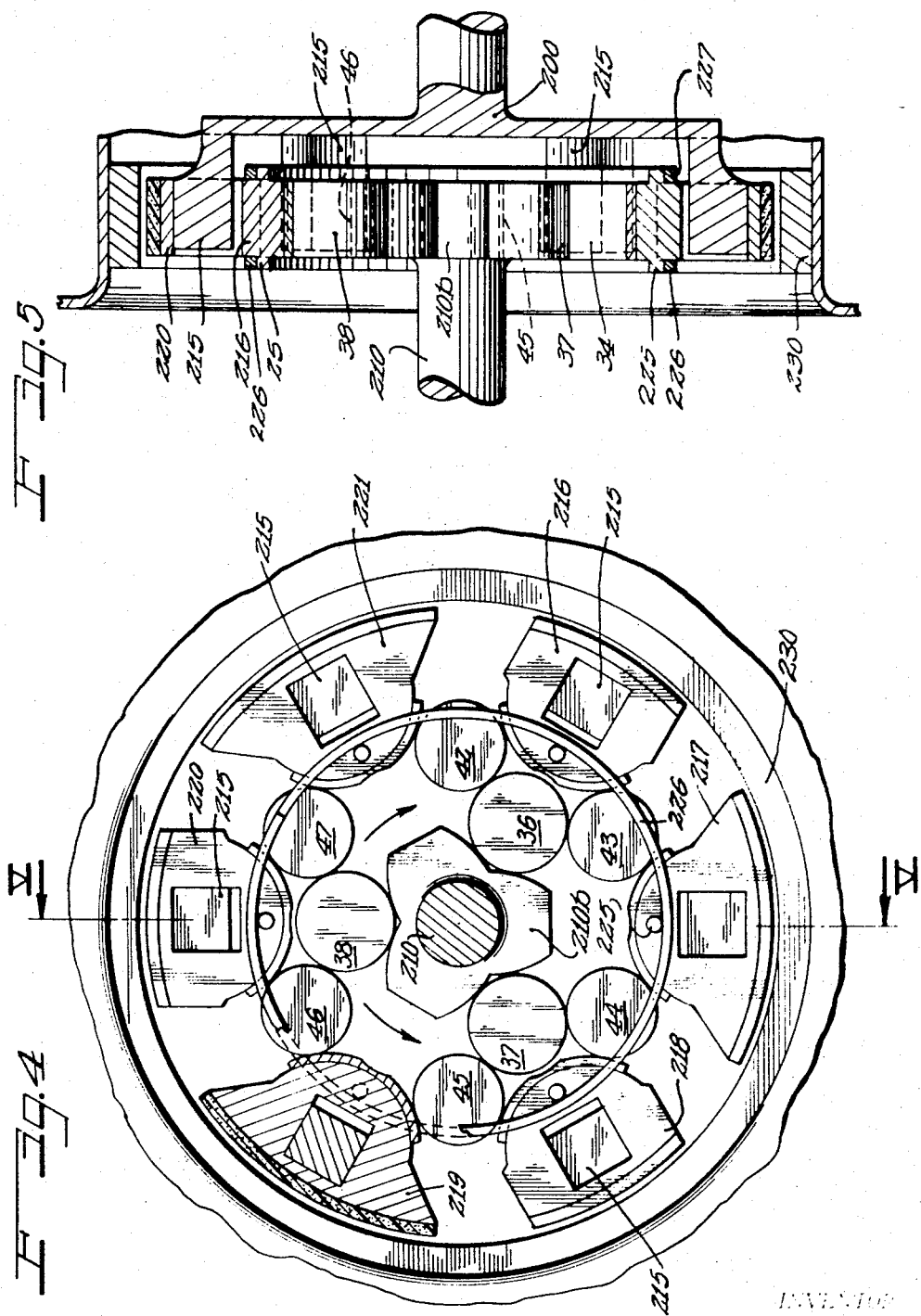
INVENTOR
Algirdas L. Nasvytis
BY Hill, Sherman, Meroni, Gross & Simpson
ATTORNEYS United States Patent Office 3,468,403
Patented Sept. 23, 1969

3,468,403
MULTIROLLER BRAKE AND CLUTCH
CONSTRUCTION
Algirdas L. Nasvytis, Cleveland, Ohio, assignor to TRW
Inc., Cleveland, Ohio, a corporation of Ohio
Filed Nov. 20, 1967, Ser. No. 684,456
Int. Cl. F16d 11/06, 13/04, 43/00
U.S. Cl. 192—41                                        10 Claims

ABSTRACT OF THE DISCLOSURE

A radially acting toggle-action brake or clutch employing friction shoes directed generally radially against the internal surface of a ring via generally balanced sets of roller type toggles simultaneously energized by a centrally located cam element. The apparatus herein described provides a simple, extremely effective clutch or brake apparatus providing extremely high load transmission and adaptable to either one-way or bidirectional brake or clutch actuation upon relative movement of the central member from a neutral condition. Another embodiment of the invention provides a normally engaged clutch or brake system operable to disengage upon the attainment of a predetermined excessive load or torque transmission. The apparatus automatically operates and provides a wedge action which substantially instantly comes into play upon relative movement between the input and output elements of the system.

BACKGROUND OF THE INVENTION

Clutches and brakes employing a peripheral ring element fixed to an output shaft (in the case of a clutch) or rigidly secured to a housing or the like (in the case of a brake) wherein a plurality of radially movable friction shoes are urged against the internal face of the ring by means of a cam element rotatable about the axis of the ring, are well known. Such systems have been manufactured for many years and are generally considered a practical form of brake or clutch mechanism. Such a device may, for example, be found in the early patent to Thomas A. Richter, No. 1,773,120, dated Aug. 19, 1930. However, such systems are relatively inefficient in the application of forces and have a tendency to bind upon release as a result of substantial amounts of sliding friction inherent in their design. They are further inefficient in not having load balancing between adjacent shoes, thereby providing a relatively uneven application of radial pressure against the ring unless all of the radially moving friction shoes are exactly the same and adjacent shoe actuators are, similarly, exactly the same, neither of which conditions is ordinarily possible of achievement.

An examination of certain fundamental principles of roller operation has demonstrated to me that extremely high levels of force application may successfully be achieved through the utilization of cylindrical roller members operating in sets against a plurality of radial friction shoes. Peripheral force balancing is very substantially improved and generally superior alignment achieved.

SUMMARY OF THE INVENTION

According to the present invention, I provide a centrally positioned actuating device in the form of a multiple lobed cam rotatable or oscillatable about a central axis. An internally facing peripheral ring element is provided concentric with the actuating shaft and cam and a plurality of radially slidable friction shoes are movable outwardly against the internal faces of the ring. Force is transmitted between the actuating cam and the individual friction shoes by way of a three-element roller toggle system arranged to provide for the transmission of force from each lobe of the actuation cam to a plurality of friction shoes. As a result of the multiple force transmission provided by the roller toggle devices, the friction force is substantially evenly distributed throughout the periphery of the brake or clutch as the case may be, thereby providing a generally balanced device having minimum bearing loads on the actuating shaft or on the output shaft or ring. By employing three element roller toggles associated with each lobe of the cam, a relatively simple cam configuration may be employed, capable of energization of the brake or clutch in either direction of rotation of the actuating cam, if desired. Further, by the reversal of the action of spring return means for controlling the desired position of the friction shoes, the system may be changed from a normally disengaged clutch or brake to an overload clutch normally operating in the torque transmitting mode.

It is, accordingly, an object of the present invention to provide a novel clutch or brake device.

Another object of the present invention is to provide an improved highly efficient multiple element toggle actuated clutch or brake system in which the clutching or braking elements are each engaged by a plurality of roller means.

A feature of the invention resides in the provision of radially outwardly movable friction shoes each engaged by a pair of roller members in a manner applying force to the shoe on opposite sides of its radial centerline.

Another feature of the invention resides in the provision of alternately larger areas of brake shoe friction contact to thereby radially load the peripheral clutch or brake ring in a substantially equal manner over its periphery.

Still a further feature of the invention comprises utilization of a single self-equalizing centering spring for controlling the position of a multiple number of friction shoes.

Still another object of the invention is to provide a friction device useful both as a clutch or brake and responsive to relative torque transmission levels for actuation.

Still other and further objects and features of the invention will at once become apparent to those skilled in the art from a consideration of the attached specification and drawings wherein several embodiments are described.

DESCRIPTION OF THE DRAWINGS

FIGURE 1 is a cross-sectional end view partially broken away, of a one-way toggle action clutch constructed in accordance with the present invention;

FIGURE 2 is a cross-sectional view taken along the line II—II of FIGURE 1;

FIGURE 4 is an end view in partial cross-section showing a torque responsive brake device embodying the present invention; and FIGURE 5 is a cross-sectional view taken along the line V—V of FIGURE 4.

DETAILED DESCRIPTION

Figure 3:
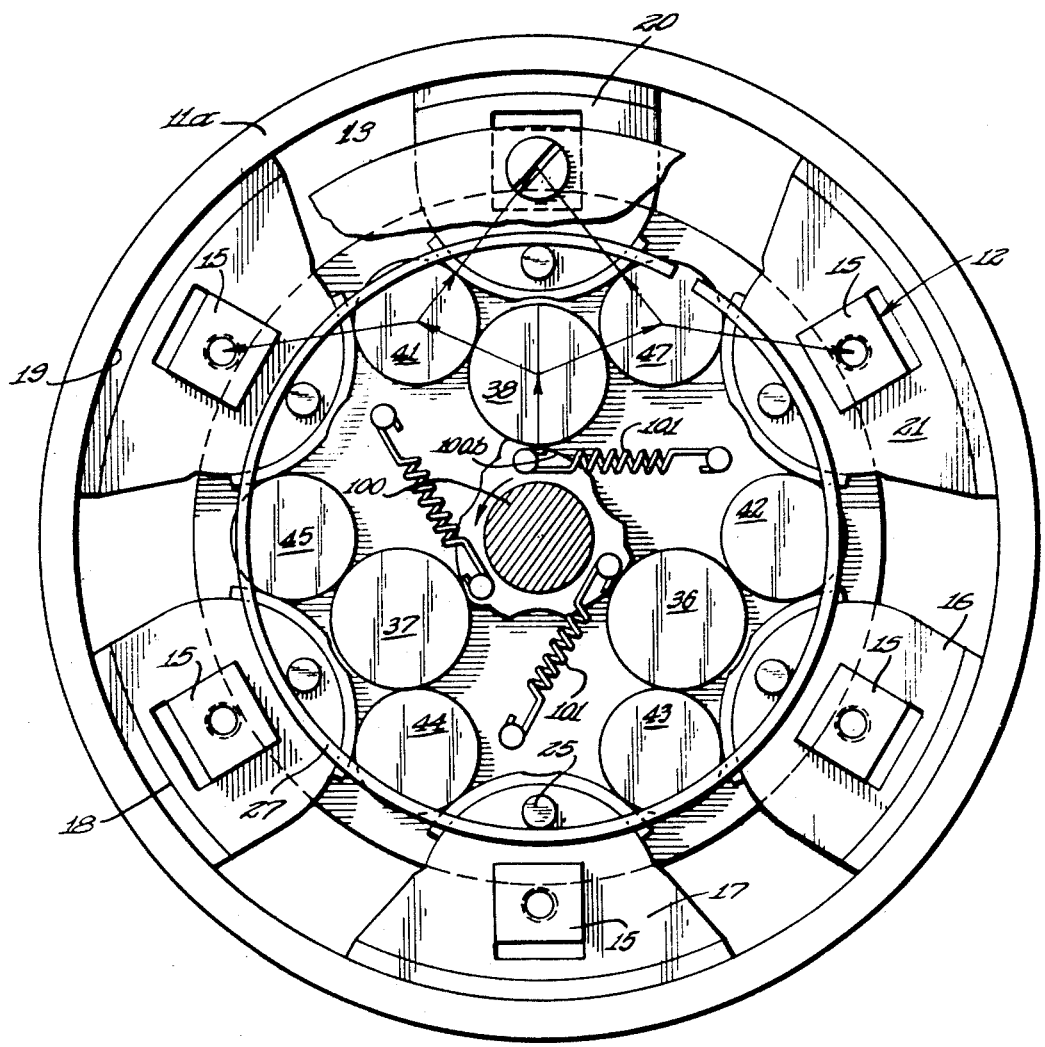
FIGURE 3 is a cross-sectional end view of a modified form of friction device constructed in accordance with the principles of the present invention.

As may be seen from a consideration of the first embodiment of the invention, shown in FIGURES 1 and 2, the friction devices comprises a clutch having an input shaft 10 and an output shaft 11. Journaled upon the input shaft for rotation thereon is a spider 12 supported by journals 13, 14. The spider 12 incorporates a plurality of square supports 15 upon which are slidably mounted radially movable brake shoes 16, 17, 18, 19, 20 and 21. Each of the individual brake shoes 16 through 21 is provided with a spring support pin 25 which cooperates with annular springs 26, 27. The pins 25 preferably project through the individual respective brake shoes and, accordingly, project on opposite sides of the shoes for identical co-operation with each of the two springs 26, 27. The annular springs 26, 27 comprise springs which are partly stressed in the position shown in FIGURES 1 and 2, and which distort with the full radial movement of the pins 25 at their outermost position. This distortion provides a force tending to move the brake shoes radially inwardly away from the output ring surface 11a.

Rotation of the input shaft 10 in the counterclockwise direction as shown by the arrow 10a will force each of the three first row rollers 36, 37, 38 generally radially outwardly along a force application line indicated by the arrow $X_1$. This movement is caused by the slope of the cam surfaces 10b. The force $X_1$ is split into two forces $Y_1$ and $Y_2$ acting through the centers of cam follower rollers 46, 47 of the second row toggle rollers 42, 43, 44, 45, 46, 47 which rollers in turn cooperate with accurately formed surfaces on the respective brake shoes. This relationship may be seen from the application of the force vectors $X_2 X_3 X_4 X_5$, as shown in FIGURE 1. It will be manifest that with the force vectors as shown, the force acting upon shoes 17, 19 and 21 are substantially greater than the forces acting on shoes 16, 18, and 20. In the form of the invention illustrated, this disparity is largely overcome by the provision of a substantially larger shoe area for the brake shoes 17, 19 and 21 so that the larger force application will be distributed over a larger area, thereby maintaining the shoe pressure, in pounds per square inch, substantially uniform over the periphery of the ring 11a. By providing substantially uniform pressure loading, the ring 11a is maintained in a substantially uniform configuration.

In operation in the embodiment shown in FIGURES 1 and 2, counterclockwise rotation of the shaft 10 will cause rotation of the output shaft 11 upon the application of a sufficient rotation of the shaft 10 relative to the rollers 38, 37, 36. Counter-rotation of the shaft 10, in the clockwise direction, will cause disengagement of the clutch upon movement of the springs 26 into their unstressed condition. Arcuate inserts 28 coated with Teflon or other low friction material facilitate slight rotation of the rollers 41–46 during actuation by cam 10b. The inserts move back and fourth but are prevented from disassembly by stops such as at 18a, 19a on the shoes 18, 19. Accordingly, a one-way clutch is provided that has extremely high loading characteristics in one direction of rotation and is substantially instantly unloaded in the opposite direction of rotation.

In the embodiment of the device illustrated in FIGURE 3, the component parts are the same, and are numbered the same, as the device shown in FIGURES 1 and 2, with the exception that the input shaft 100 is formed with a reversely sloped cam surface 100b and is normally biased by springs 101 secured to plate 12 in the clockwise direction, tending to maintain the brake shoes in the position illustrated in which the shoes are engaged when the clutch is in operation and the shaft 100 is rotated in the counterclockwise direction, the clutch will remain engaged until such time as the torque being transmitted overcomes the tension of the springs 101 at which time the springs 26, 27 will tend to disengage the brake shoes. With this arrangement, the clutch shown in FIGURE 3 operates as an overload release clutch, and one which tends to transmit a prescribed torque with an upper maximum.

A brake device embodying the principles of the present invention is shown in FIGURES 4 and 5. There, the input shaft 200 is provided with square spider supports 215 cooperating with six brake shoes 216, 217, 218, 219, 220 and 221. The shoes are resiliently urged radially inwardly by means of the springs 226, 227 which operate against the brake shoe pins 225. An annular fixed brake shoe plate 230 is provided.

In operation, the device of FIGURES 4 and 5 operates as a braking device to limit the torque of the input shaft 200 relative to the output shaft 210. Rotation of the spiders 215 carrying the brake shoes, will initially upon any torque load appearing at the shaft 210, cause a negative rotation with respect to the shaft 210 and its cam 210b, independently of the direction of rotation. This relative motion will cause outward movement of the brake shoes as a result of the roller actuation and, upon a build-up of a predetermined degree of torque, sufficient to overcome the springs 226, 227, the brake shoes will contact the fixed brake surface 230 and retard rotation of the input shaft 200, thereby limiting the transmitted torque. The cam 210b is a bidirectional cam as can be clearly seen from FIGURE 4 and it will be understood that such a cam may be employed with clutch devices if bidirectional clutches are desired.

From the discussion above, it will be clear that I have provided a novel friction device in which the application of torque is controlled by a toggle action which is achieved through the utilization of sets of three rollers. These rollers operate without the need for support pivots and provide extremely rigid force transfer means which are incapable of binding or otherwise distorting to prevent substantially instant release upon the release of torque. The torque transfer is positive and provides for substantial equalization of the force transfer around the periphery of the clutch device. The system is useful for the transmission of torque in the manner of a clutch or as an overload torque lock as described, or as a simple brake. As a simple brake, the cam 10, 210 comprises the brake actuator while the ring and spider comprise the relatively braked members.

I claim as my invention:

1. A friction device comprising an annular ring member having an internally facing annular surface, an actuating shaft concentric with said ring and having a plurality of equally peripherally spaced cam surfaces of a number N, a plurality of generally circular cam follower members of a number N, a plurality of friction shoe elements each having a generally arcuate outer friction surface of a curvature substantially in conformity with the curvature of the interior surface of said ring and of a number comprising 2N, means fixing each of said friction shoes peripherally relative to each other and a plurality of circular toggle members of a number 2N each of said toggle members contacting one of said cam follower members and two of said friction shoes.

2. The friction device set forth in claim 1 including resilient means biasing said friction shoes radially inwardly out of contact with said ring.

3. The friction device set forth in claim 1 including resilient means normally biasing said actuating shaft in a relative direction causing positioning of friction shoes outwardly in engagement with said ring.

4. The friction device set forth in claim 1 wherein said means fixing the peripheral position of said friction shoes is rigidly carried by an input member and said actuating shaft is rigidly connected to an output member.

5. The friction device set forth in claim 1 wherein the inner surface of each of said friction shoe elements comprises an arc of a circle providing a contact with said circular toggle members forcing said toggle members into equal peripheral spacing.

6. The friction device set forth in claim 1 wherein the individual arcuate outer friction surfaces of alternate friction shoe elements are of a larger friction area than the remaining friction shoe and wherein the friction shoes in substantial radial alignment with the respective circular cam follower members comprise friction shoes of smaller area.

7. The friction device constructed in accordance with claim 1 wherein said circular cam follower members and alternate ones of said friction shoe elements are generally radially aligned relative to the axis of said actuating shaft.

8. Apparatus in accordance with claim 2 wherein said resilient means comprises annular ring means contacting at least one outwardly facing surface on each of said shoe members to prevent outward movement of each of said shoe members without deformation of said ring.

9. The friction device set forth in claim 1 wherein said cam surfaces provide an increasing radial distance in one direction of movement of said cam element whereby said friction device comprises a unidirectionally applicable clutch or brake.

10. The friction device set forth in claim 1 wherein said cam surfaces each have a neutral point of minimum radial dimension wherein said shoe elements are removed from said ring annular surface and increasing radius in both directions away from said neutral condition, whereby movement of said actuating shaft in either direction of rotation will cause engagement of said shoe elements with said ring.

References Cited

UNITED STATES PATENTS

| | | | |
|---|---|---|---|
| 988,987 | 4/1911 | Evers | 192—76 |
| 1,050,207 | 1/1913 | Evers | 192—76 |
| 1,962,939 | 6/1934 | Roberts. | |

CARLTON R. CROYLE, Primary Examiner

ALLAN O. HERRMANN, Assistant Examiner

U.S. Cl. X.R.

188—78, 134; 192—7, 56, 76